United States Patent
Yoshimura et al.

(10) Patent No.: US 12,192,791 B2
(45) Date of Patent: Jan. 7, 2025

(54) QUALITY ESTIMATION APPARATUS, METHOD AND NON-TRANSITORY COMPUTER READABLE MEDIUM FOR CONSTRUCTING QUALITY OF EXPERIENCE ESTIMATION MODELS

(71) Applicant: NIPPON TELEGRAPH AND TELEPHONE CORPORATION, Tokyo (JP)

(72) Inventors: Noriko Yoshimura, Musashino (JP); Noritsugu Egi, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 510 days.

(21) Appl. No.: 17/595,602

(22) PCT Filed: May 27, 2019

(86) PCT No.: PCT/JP2019/020944
§ 371 (c)(1),
(2) Date: Nov. 19, 2021

(87) PCT Pub. No.: WO2020/240669
PCT Pub. Date: Dec. 3, 2020

(65) Prior Publication Data
US 2022/0232398 A1    Jul. 21, 2022

(51) Int. Cl.
*H04W 24/02* (2009.01)
*H04W 24/10* (2009.01)
*H04W 28/24* (2009.01)

(52) U.S. Cl.
CPC .......... *H04W 24/02* (2013.01); *H04W 24/10* (2013.01); *H04W 28/24* (2013.01)

(58) Field of Classification Search
CPC ...... H04W 24/02; H04W 24/10; H04W 28/24
USPC ......................................................... 370/252
See application file for complete search history.

(56) References Cited

U.S. PATENT DOCUMENTS

| | | | |
|---|---|---|---|
| 2014/0287730 A1* | 9/2014 | Masuda | H04N 21/6543 455/414.3 |
| 2015/0009826 A1* | 1/2015 | Ma | H04W 28/0289 370/235 |
| 2015/0181605 A1 | 6/2015 | Kurihara | |
| 2020/0244547 A1* | 7/2020 | Uppili | H04L 67/568 |

FOREIGN PATENT DOCUMENTS

| | | |
|---|---|---|
| JP | 2014-003517 | 1/2014 |
| JP | 2014-183424 | 9/2014 |
| JP | 2015-513829 | 5/2015 |
| JP | 2017-011419 | 1/2017 |

* cited by examiner

*Primary Examiner* — Faisal Choudhury
(74) *Attorney, Agent, or Firm* — IPUSA, PLLC (57) ABSTRACT

A quality estimation apparatus acquires quality information including QoEs and quality index values collected on a user terminal in a wireless network environment; and classifies the QoEs and quality index values according to area attributes. The quality estimation apparatus constructs QoE estimation models according to the respective area attributes using the acquired QoEs and quality index values for the respective area attributes.

19 Claims, 11 Drawing Sheets

| ANSWER/MEASUREMENT DATE AND TIME | QoE | QUALITY INDEX VALUE (WEB LOADING TIME) | COMMUNICATIONS SCHEME | POSITION INFORMATION (LATITUDE AND LONGITUDE) |
|---|---|---|---|---|
| 2019.2.xx | 3 | | | |
| 2019.2.zz | 4 | | | |
| ... | | | | |

QUALITY ESTIMATION APPARATUS, METHOD AND NON-TRANSITORY COMPUTER READABLE MEDIUM FOR CONSTRUCTING QUALITY OF EXPERIENCE ESTIMATION MODELS

TECHNICAL FIELD

The present invention relates to a technique for estimating QoE (quality of experience), which is quality experienced by the users who use services via a wireless network.

BACKGROUND ART

Related techniques for estimating QoE include, for example, Patent Literature 1. Patent Literature 1 discloses a technique that improves QoE of communications by sharing quality information about each application used on a communications terminal between a common carrier and user in cooperation with each other.

Specifically, the technique disclosed in Patent Literature 1, estimates QoE using quality information on the communications area to which the communications terminal belongs, and improves QoE by changing a connection destination based on estimation results.

CITATION LIST

Patent Literature

Patent Literature 1: Japanese Patent Laid-Open No. 2017-11419

SUMMARY OF THE INVENTION

Technical Problem

By estimating QoE on an area by area basis, it is possible to implement supervision and control over a network and services in terms of user experience. In so doing, due to differences in characteristics of areas (hereinafter referred to as area attributes), it is assumed that even when service quality is the same, QoE may vary. For example, it is conceivable that due to differences in usage or urgency, QoE evaluation characteristics may be stricter in business districts than in residential districts.

As described above, the technique disclosed in Patent Literature 1 estimates QoE using the quality information on the communications area to which the communications terminal is connected and improves QoE by changing a connection destination based on estimation results. However, the technique disclosed in Patent Literature 1 does not take area attributes into consideration in estimating QoE, and thus can overestimate QoE, for example, in business districts, which may result in overlooking quality deterioration related to user influence.

The present invention has been made in view of the above point and has an object to provide a technique that enables estimating QoE by taking into consideration the area attributes of the area in which the user is using a service.

Means for Solving the Problem

According to a disclosed technique, there is provided a quality estimation apparatus comprising: an acquisition unit configured to acquire quality information including QoEs and quality index values collected on a user terminal in a wireless network environment; and a construction unit configured to classify the QoEs and quality index values according to area attributes, the QoEs and quality index values being acquired by the acquisition unit, and construct QoE estimation models according to the respective area attributes using the QoEs and quality index values for the respective area attributes.

Effects of the Invention

The disclosed technique, implements QoE estimation close to user experience quality by adopting an optimum model for an area under evaluation from QoE estimation models constructed for the respective area attributes.

DESCRIPTION OF EMBODIMENTS

An embodiment of the present invention will be described below with reference to the drawings. The embodiment described below is only exemplary, and embodiments to which the present invention is applicable are not limited to the embodiment described below.

In the following description, for example, LTE is cited as a communications scheme, this is exemplary, and the present invention is also applicable to 3G and 5G.

Overview of Embodiment

First, a brief overview of the embodiment will be provided. According to the present embodiment, in a wireless network environment such as LTE, from various quality information collected beforehand on a user terminal, QoE estimation models based on respective area attributes are constructed in a quality estimation system. The various quality information includes, for example, QoE, quality index values (such as Web loading time), position information (which may be area attributes), communications schemes (such as LTE and WiFi (registered trademarks))), and the like.

During QoE estimation, the quality estimation system 300 performs QoE estimation close to the quality experienced by users who actually use the system, by applying a QoE estimation model corresponding to an area attribute of an area under evaluation, based on quality index values and position information collected separately. Consequently, for example, if reduced QoE is confirmed in a target area, the band can be reinforced by expanding facilities on a priority basis.

Note that the "area" in the following description means an area of a predetermined size, such as a three-dimensional mesh. However, the "area" may be either smaller or larger than the three-dimensional mesh. Also, the "position information" described below means, for example, latitude and longitude, but in determining an area attribute, an "area" corresponding to the latitude and longitude is used. Also, the "position information" may identify an "area."

The area attributes available for use include not only classification results such as business district and residential district, but also prefecture and municipality. Also, if it is assumed that characteristics may vary between weekdays and Saturdays/Sundays/holidays even if the place is the same, the area attributes may be further classified into business district on weekdays and business district on Saturdays/Sundays/holidays. In terms of the communications scheme, the area attributes may be further classified, for example, into LTE and WiFi (registered trademarks). The embodiment of the present invention will be described in more detail below.

Overall Configuration of System

Figure 1:
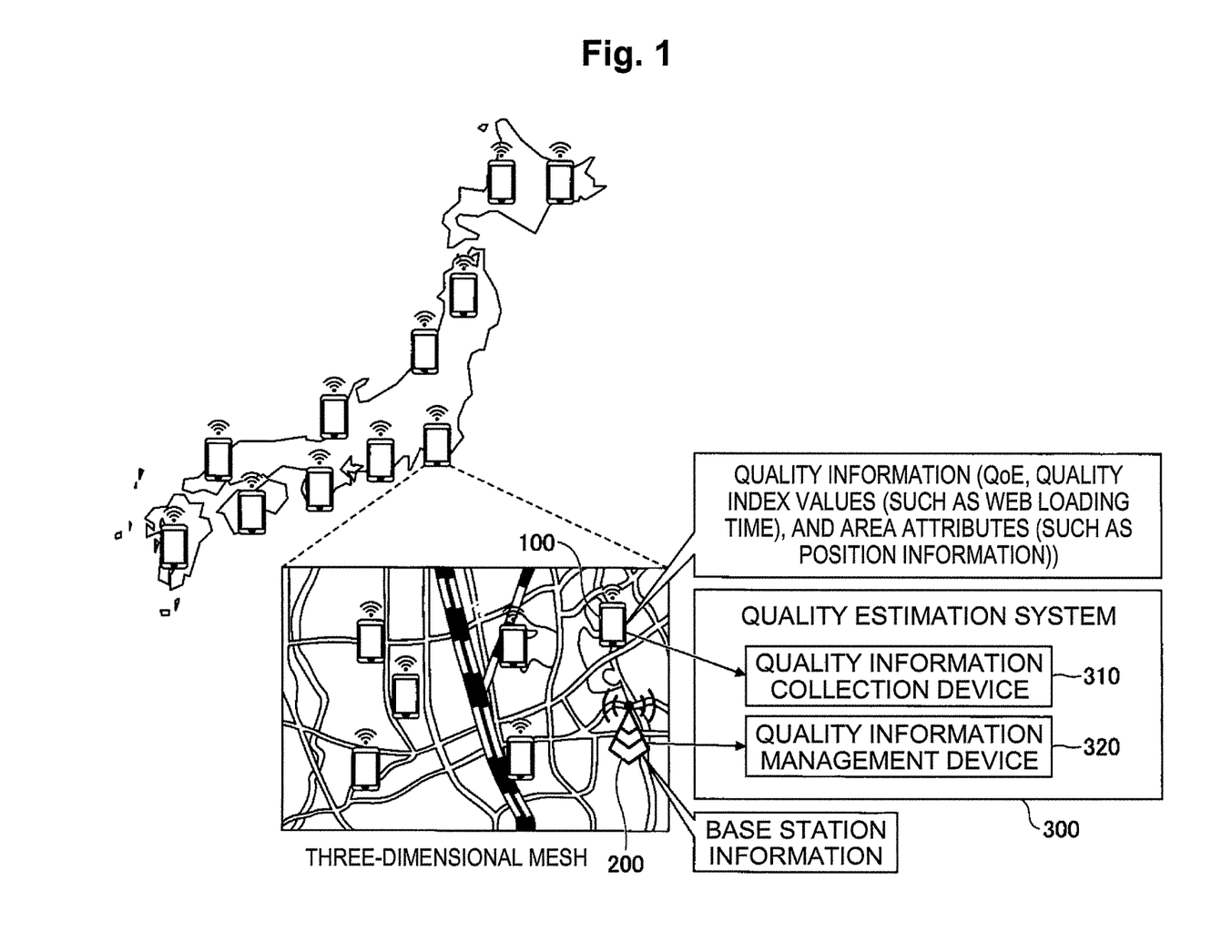
FIG. 1 is a diagram showing an example of a coverage according to an embodiment of the present invention.

According to the present embodiment, as shown in FIG. 1, a quality information collection device 310 collects various quality information about various places from one or more user terminals 100 connected to a mobile network. Part (such as position information) of the quality information may be collected as base station information from a base station 200.

Then, the quality information management device 320 constructs QoE estimation models corresponding to area attributes from the collected quality information and performs QoE estimation using the QoE estimation models. In the example shown in FIG. 1, information is shown to be collected from all over Japan, but this is an example, and is not restrictive. For example, information may be collected from abroad, from all over the world, or from some regions of Japan.

Figure 2:
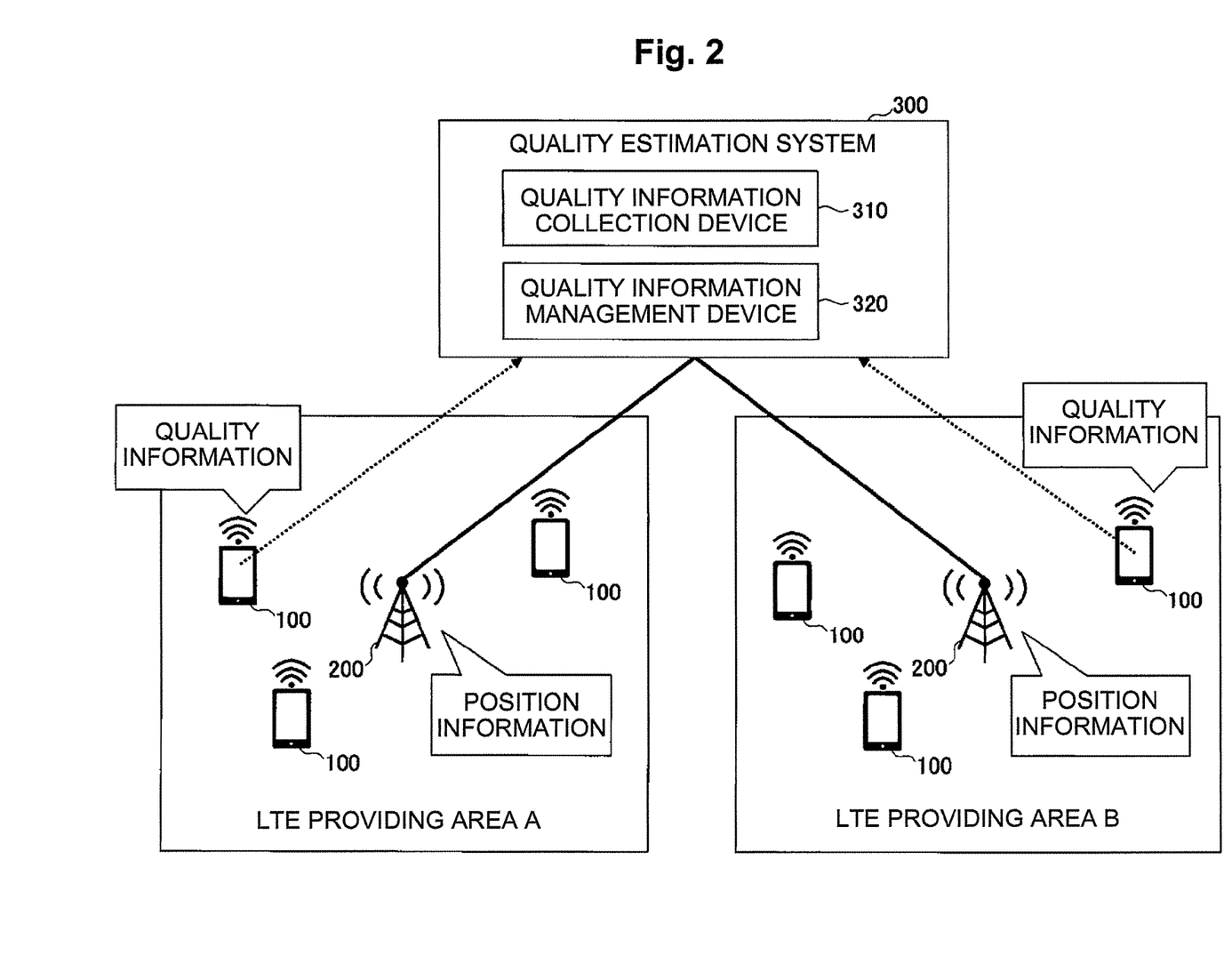
FIG. 2 is a diagram showing an overall configuration of a system according to the embodiment of the present invention.

FIG. 2 is a diagram showing an overall configuration of the system. LTE providing area A and LTE providing area B are shown as an example in FIG. 2. As shown in FIG. 2, the quality estimation system 300 includes the quality information collection device 310 and quality information management device 320 described above.

The quality estimation system 300 may be provided on a core network of a mobile network or provided on a network (e.g., the Internet) external to the mobile network. Alternatively, a certain base station may have a function of the quality estimation system 300, or a certain user terminal may have a function of the quality estimation system 300. In either case, the user terminal 100 and quality estimation system 300 can communicate with each other via a communications network.

The quality information collection device 310 collects quality information (including QoE, quality index values, and position information) from user terminals 100 existing in LTE providing areas. Also, the quality information collection device 310 may collect position information from the base station 200. Based on the collected information, the quality information management device 320 constructs QoE estimation models according to respective area attributes.

Exemplary Functional Configurations of Devices

Figure 3:
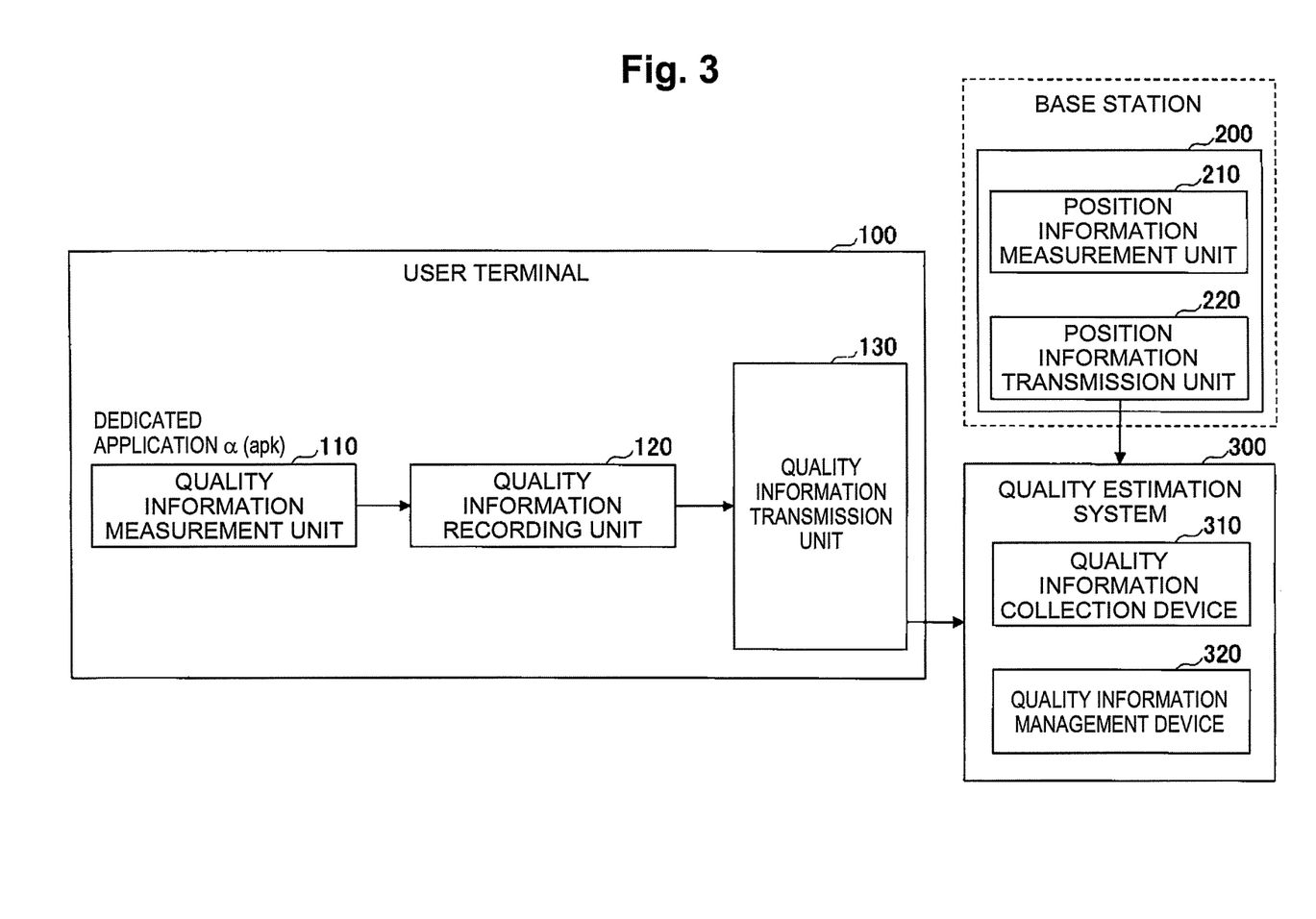
FIG. 3 is a diagram showing functional configurations of a user terminal 100 and base station 200.

FIG. 3 is a diagram showing exemplary functional configurations of the user terminal 100 and base station 200. As shown in FIG. 3, the user terminal 100 includes a quality information measurement unit 110, a quality information recording unit 120, and a quality information transmission unit 130. The base station 200 includes a position information measurement unit 210 and a position information transmission unit 220. Note that these functional parts on the user terminal 100 and base station 200 are functional parts related to a technique of the present invention, and the user terminal 100 and base station 200 are each equipped with various non-illustrated existing functional parts.

According to the present embodiment, the quality information measurement unit 110, quality information recording unit 120, and quality information transmission unit 130 of the user terminal 100 are implemented by a dedicated application (referred to as the "dedicated application α") run on the user terminal 100. The dedicated application α is capable of Web browsing for measuring quality information. However, it is only exemplary that the quality information measurement unit 110, quality information recording unit 120, and quality information transmission unit 130 are implemented by the dedicated application α.

Figure 4:
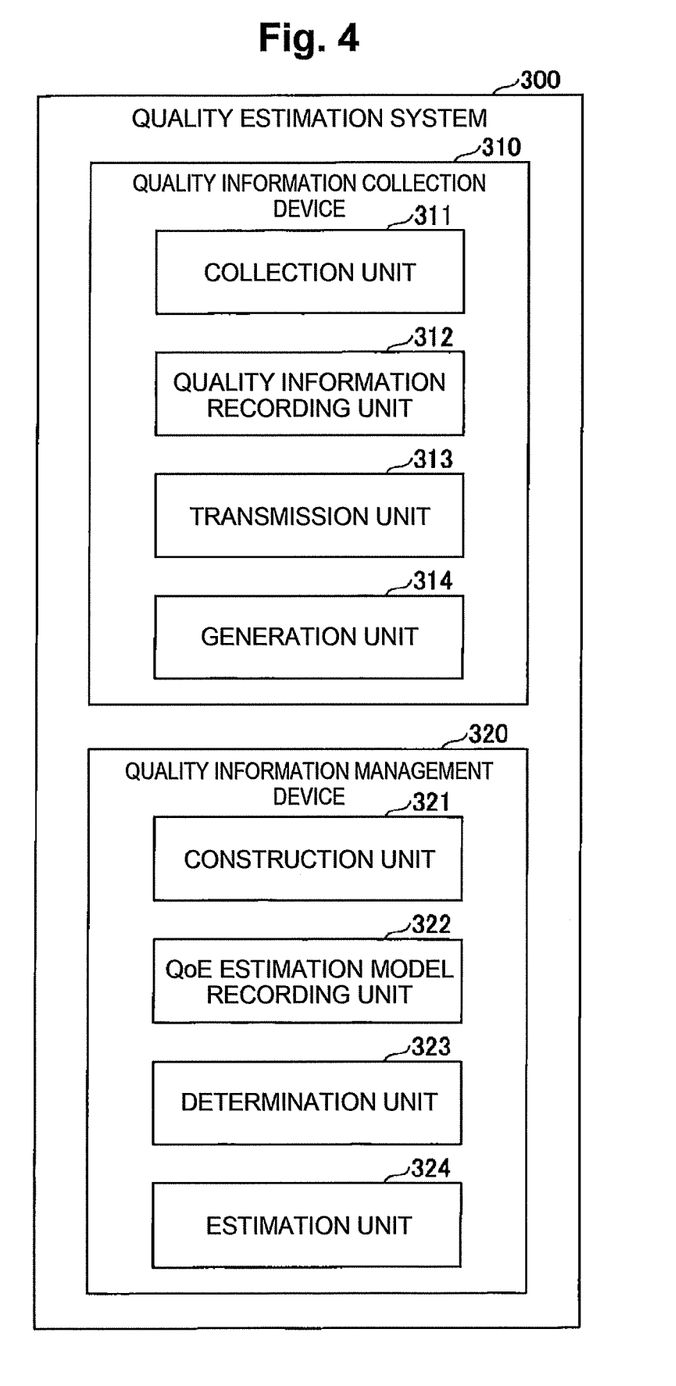
FIG. 4 is a diagram showing functional configurations of a quality information collection device 310 and quality information management device 320.

FIG. 4 is a diagram showing exemplary functional configurations of the quality information collection device 310 and quality information management device 320. As shown in FIG. 4, the quality information collection device 310 includes a collection unit 311, a quality information recording unit 312, a transmission unit 313, and a generation unit 314. The quality information management device 320 includes a construction unit 321, a QoE estimation model recording unit 322, a determination unit 323, and an estimation unit 324.

The collection unit 311 may be referred to as an acquisition unit. The collection unit 311 acquires the QoE and quality information including the quality index values collected on the user terminal in the wireless network environment.

The construction unit 321 classifies the acquired QoEs and quality index values according to area attributes and constructs QoE estimation models according to the respective area attributes using the QoEs and quality index values for the respective area attributes.

The determination unit 323 acquires the quality index value from a target user terminal whose QoE is to be estimated and determines the area attribute of the area in which the target user terminal is located, based on mapping information between areas and area attributes. Using the QoE estimation model corresponding to the area attribute determined by the determination unit 323, the estimation unit 324 estimates the QoE on the target user terminal based on the quality index value acquired from the target user terminal.

The generation unit 314 generates the mapping information between areas and area attributes based on position information that indicates the position in which the user terminal is located and time-series information about the quality index value.

Note that although in the example described in the present embodiment, the quality information collection device 310 and quality information management device 320 are separate from each other, the quality information collection device 310 and quality information management device 320 may be implemented as a unified device. The unified device may be referred to as a quality estimation apparatus or quality estimation system. Also, the quality information management device 320 may be referred to as a quality estimation hardware.

Exemplary Hardware Configuration

The devices according to the present embodiment (user terminal 100, base station 200, quality information collection device 310, quality information management device 320, quality estimation system, and quality estimation apparatus) can be implemented, for example, by causing a computer to execute programs describing processing details of the present embodiment. Note that the "computer" may be a virtual machine provided by a cloud service. When a virtual machine is used, "hardware" described herein is virtual hardware.

The apparatus can be implemented by executing programs corresponding to the processes run on the apparatus using hardware resources such as a built-in CPU or memory of the computer. The programs can be saved or distributed by being recorded on a computer-readable recording medium (such as a portable memory). Also, the programs can be provided via a network, for example by means of electronic mail or the Internet.

Figure 5:
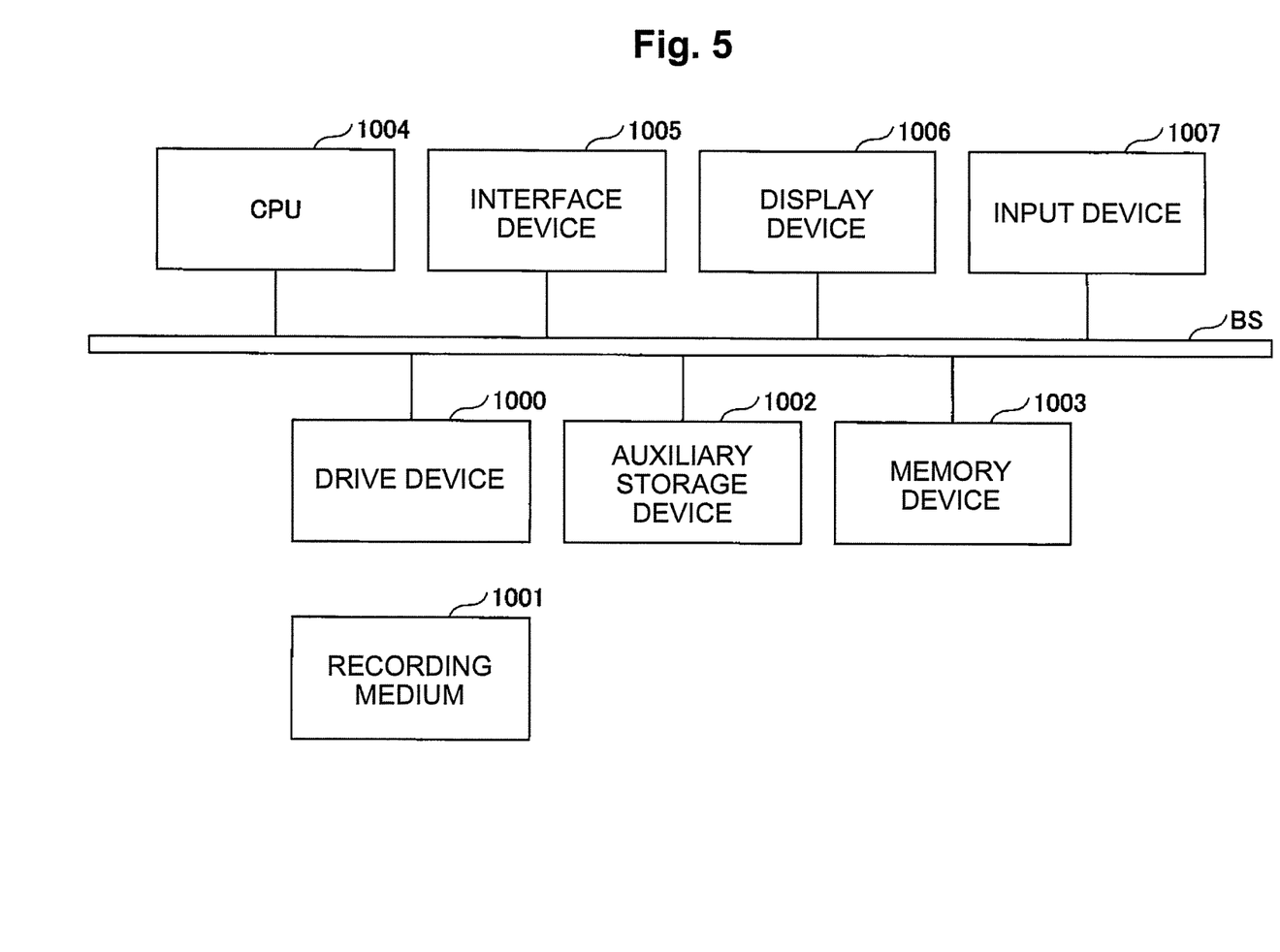
FIG. 5 is a diagram showing an exemplary hardware configuration of a device.

FIG. 5 is a diagram showing an exemplary hardware configuration of the computer according to the present embodiment. The computer of FIG. 5 includes a drive device 1000, an auxiliary storage device 1002, a memory device 1003, a CPU 1004, an interface device 1005, a display device 1006, and an input device 1007, which are interconnected via a bus B.

The programs that implement the processes on the computer are provided, for example, via a recording medium 1001 such as a CD-ROM or memory card. When the recording medium 1001 containing the programs is set in the drive device 1000, the programs are installed in the auxiliary storage device 1002 from the recording medium 1001 via the drive device 1000. However, the programs do not necessarily have to be installed from the recording medium 1001, and may be downloaded from another computer via a network. The auxiliary storage device 1002 stores necessary files, data, and the like as well as the installed programs.

When a program start command is issued, the memory device 1003 stores the programs by reading the programs out of the auxiliary storage device 1002. According to the programs stored in the memory device 1003, the CPU 1004 implements functions related to the quality estimation apparatus. The interface device 1005 is used as an interface for connecting to the network. The display device 1006 displays a GUI (Graphical User Interface) and the like provided by the programs. The input device 1007 is made up of a keyboard, a mouse, and buttons, or a touch panel and the like, and is used to enter various operating commands.

Operation examples of the user terminal 100, base station 200, quality information collection device 310, and quality information management device 320 configured as described above will be described in detail below.

According to the present embodiment, a QoE estimation model corresponding to each area attribute is constructed and QoE is estimated using the constructed QoE estimation model based on the quality index value collected from the user terminal.

Construction of QoE Estimation Model Corresponding to Each Area Attribute

First, construction of a QoE estimation model corresponding to each area attribute will be described. QoE estimation of a Web browsing service in an LTE or other wireless network environment will be described here as an example. However, the QoE estimation of a Web browsing service is only exemplary, and the present invention is applicable without limitation to the QoE estimation of a Web browsing service.

The dedicated application α capable of Web browsing for measuring quality information has been installed on the user terminal 100. Using functions of the dedicated application α, various quality information (QoE, quality index (such as Web loading time), position information, communications schemes (such as LTE and WiFi (registered trademarks))), area attributes) is acquired when the user is using Web browsing. Methods for acquiring various information will be described below.

<Measurement of QoE>

First, QoE measurement on the user terminal 100 will be described with reference to FIG. 6.

It is assumed that the user uses, for example, a Web browsing service in an LTE or other wireless network environment. The user starts the dedicated application α on the user terminal 100 and gives an answer about QoE (user experience quality) at that time on a questionnaire screen displayed by a function (the quality information measurement unit 110 in the configuration diagram of FIG. 3) of the dedicated application α (FIG. 3). The dedicated application α is designed to allow the user himself/herself to answer questions provided in the form of a questionnaire, and is able to collect quality information in the background (quality index values and the like).

To describe with reference to the functional configurations of FIG. 3, the quality information measurement unit 110 displays the questionnaire screen and records the answer entered by the user in the quality information recording unit 120. Also, the quality information measurement unit 110 automatically measures the quality index values (such as Web loading time) in the background and records measurement results in the quality information recording unit 120. Besides, when recording the quality index values in the quality information recording unit 120, the quality information measurement unit 110 also records the communications scheme (such as LTE or WiFi (registered trademarks)) used at this time as well as the current time in the quality information recording unit 120.

Figure 6:
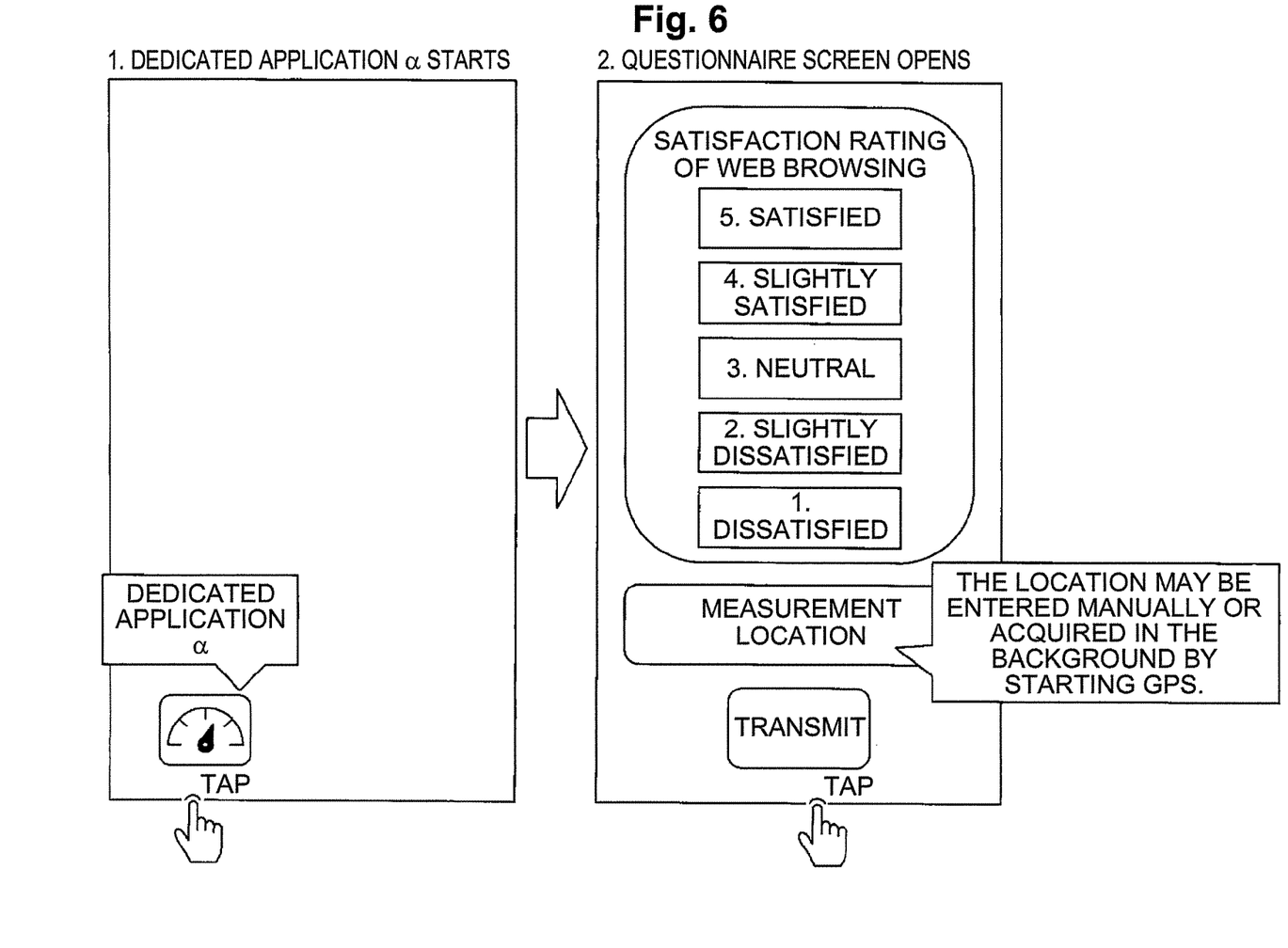
FIG. 6 is a diagram showing an exemplary questionnaire screen on the user terminal 100.

In the example of FIG. 6, an answer to a satisfaction rating of Web browsing is given by being triggered by the user, but a signal prompting an answer may be transmitted to the user terminal 100 from the quality information management device 320 (or quality information collection device 310) as required. Upon reception of the signal, for example, an answer screen starts up on the user terminal 100.

<Measurement of Quality Index Values>

As described above, measurements of the quality index values (such as Web loading time) are taken automatically by the dedicated application α when a Web browsing service is being used in the LTE or other wireless network environment.

<Acquisition of Area Attribute>

Next, acquisition of an area attribute will be described. An area attribute is acquired, for example, as the user himself/herself gives an answer to a questionnaire. As shown, for example, in FIG. 6, the user enters the area attribute (shown as "measurement location" in FIG. 6) on a screen displayed by the dedicated application α (the quality information measurement unit 110 of the user terminal 100). Information about the entered area attribute is recorded in the quality information recording unit 120.

Also, the dedicated application α (the quality information measurement unit 110 of the user terminal 100) may acquire position information (e.g., latitude and longitude) using a GPS function, acquire an area attribute using mapping information between an area identified by the position information and the area attribute, and record the acquired area attribute in the quality information recording unit 120.

The mapping information between areas and area attributes may be generated by the user terminal 100 as described later and held in the user terminal 100 beforehand or generated and held by a server on the Internet and then used by the user terminal 100 by accessing the server. The server may be the quality information collection device 310 or quality information management device 320.

Also, the area attributes may be acquired by the quality information collection device 310 rather than the user terminal 100. In that case, the user terminal 100 transmits position information (contained in quality information) to the quality information collection device 310, which then converts the position information into an area attribute using the mapping information between areas and area attributes held in a storage device of the quality information collection device 310. The quality information collection device 310 may generate the mapping information between areas and area attributes by itself using the generation unit 314 or acquire mapping information between areas and area attributes from another server or the like. Alternatively, the quality information management device 320 may generate mapping information between areas and area attributes.

Also, a position information measurement unit 210 of the base station 200 may measure position information about the user terminal 100 such that the position information transmission unit 220 will transmit the position information to the quality information collection device 310 in order for the quality information collection device 310 to convert the position information into an area attribute using the mapping information between areas and area attributes. In that case, however, the quality information collection device 310 links acquisition time of the quality information (QoE, quality index value, etc.) on the user terminal 100 to acquisition time of the position information about the user terminal 100 acquired on the base station 200. That is, the quality information (QoE, quality index value, etc.) and position information (area attribute) acquired at the same acquisition time are used.

<Mapping Generation Between Areas and Area Attributes>

Now, description will be given of a method for generating mapping information between areas and area attributes, the method being performed by the user terminal 100 (or the quality information collection device 310). First, description will be given by citing a case in which the user terminal 100 generates mapping information. Note that the mapping information may be generated by the quality information measurement unit 110 of the user terminal 100 or a functional part of the user terminal 100 other than the quality information measurement unit 110.

The quality information recording unit 120 of the user terminal 100 stores time-series information about the quality index value in relation to each area (position information) in which the user terminal 100 exists and uses a service. The user terminal 100 determines the area attribute of the area based, for example, on variability characteristics of the quality index value of the area.

Figure 7:
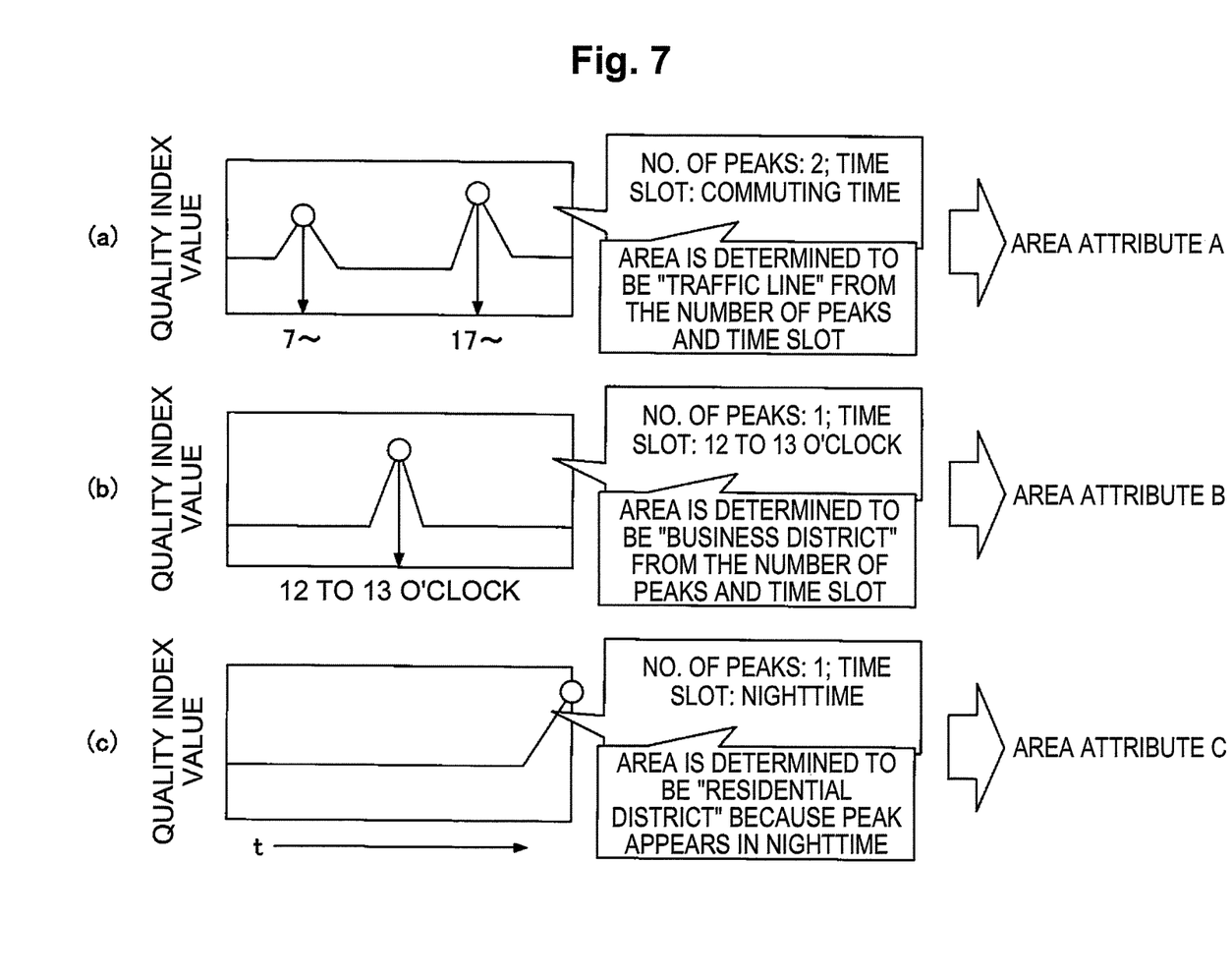
FIGS. 7(a) to 7(c) are diagrams showing an example of mapping between areas and area attributes.

A specific example will be described with reference to FIG. 7. The user terminal 100 reads quality index values (such as Web loading time) recorded for an area out of the quality information recording unit 120 and grasps peak generation characteristics (specifically, the number of times and generation time slots are grasped) of time-series quality index values.

For example, if peaks are generated twice, in the morning and evening (if the Web loading time is longer than at the same time on holidays) as shown in FIG. 7(a), it is highly likely that the area is a commuting route (□ traffic line), and consequently the area attribute (area attribute A in FIG. 7(a)) of the area is determined to be a "traffic line."

Also, if a peak appears only in a time slot corresponding to a lunch break as shown in FIG. 7(b), the area attribute (area attribute B in FIG. 7(b)) of the area is determined to be a "business district." Also, if a peak appears only in the nighttime as shown in FIG. 7(c), the area attribute (area attribute C in FIG. 7(c)) of the area is determined to be a "business district."

Also, if it is assumed that evaluation characteristics vary between weekdays and holidays such as in business districts, the area attribute of data acquired on weekdays and the area attribute of data acquired on holidays may be classified into different area attributes, with the former being classified into "weekday business district" and the latter being classified into "holiday business district."

Note that it is assumed that quality will vary with the communications scheme (LTE or WiFi (registered trademarks)) that is used, and thus even if the area is the same (such as business districts), the data acquired with these communications schemes may be similarly classified into different area attributes. For example, a business district that uses LTE may be designated as an "LTE business district."

The user terminal 100 holds generated mapping information between areas and area attributes, for example, in the quality information recording unit 120.

When the generation unit 314 of the quality information collection device 310 generates mapping information between areas and area attributes, processing details are the same as described above. However, the quality information collection device 310 generates the mapping information between areas and area attributes using quality information (the information stored in the quality information recording unit 312) collected from one or more user terminals 100.

Note that the quality index values and position information data used here may be collected not only by the dedicated application α, but also by a dedicated application β described later.

<Collection of Answers and Measurement Results>

Figure 8:
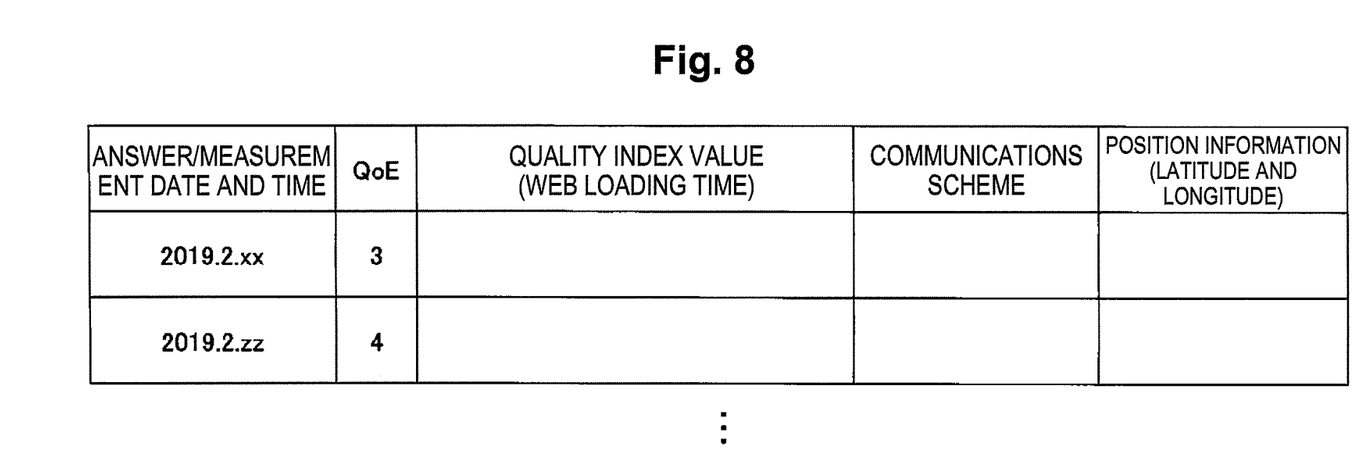
FIG. 8 is a diagram showing an example of information recorded in a quality information recording unit 120.

The user terminal 100 temporarily records the QoE, quality index values, communications schemes, position information, and the like acquired by the method described so far in the quality information recording unit 120. An example of information recorded in the quality information recording unit 120 is shown in FIG. 8. In the example of FIG. 8, time (answer/measurement date and time), QoE, quality index value (Web loading time), communications scheme, and position information are recorded. When the area attribute is acquired on the side of the user terminal 100, the area attribute corresponding to the position information may be recorded additionally.

The quality information transmission unit 130 of the user terminal 100 reads information (information yet to be transmitted) out of the quality information recording unit 120 and transmits the information to the quality information collection device 310, for example, periodically. Also, the quality information transmission unit 130 of the user terminal 100 may read information (information yet to be transmitted) out of the quality information recording unit 120 upon receiving a request from the quality information management device 320, which manages quality information, and transmit the information to the quality information collection device 310. Also, the quality information transmission unit 130 of the user terminal 100 may read information (information yet to be transmitted) out of the quality information recording unit 120 when "Transmit" shown in FIG. 6 is tapped, and transmit the information to the quality information collection device 310.

The collection unit 311 of the quality information collection device 310 receives quality information transmitted from the user terminals 100 and records the quality information in the quality information recording unit 312. Also, when no quality information is transmitted from any of the user terminals 100 or in similar situations, the generation unit 314 of the quality information collection device 310 finds the area attribute corresponding to the position information (or the time and communications scheme as well) contained in the quality information received from the user terminal 100 based on the mapping information between areas and area attributes, and records the area attribute in the quality information recording unit 312.

Figure 9:
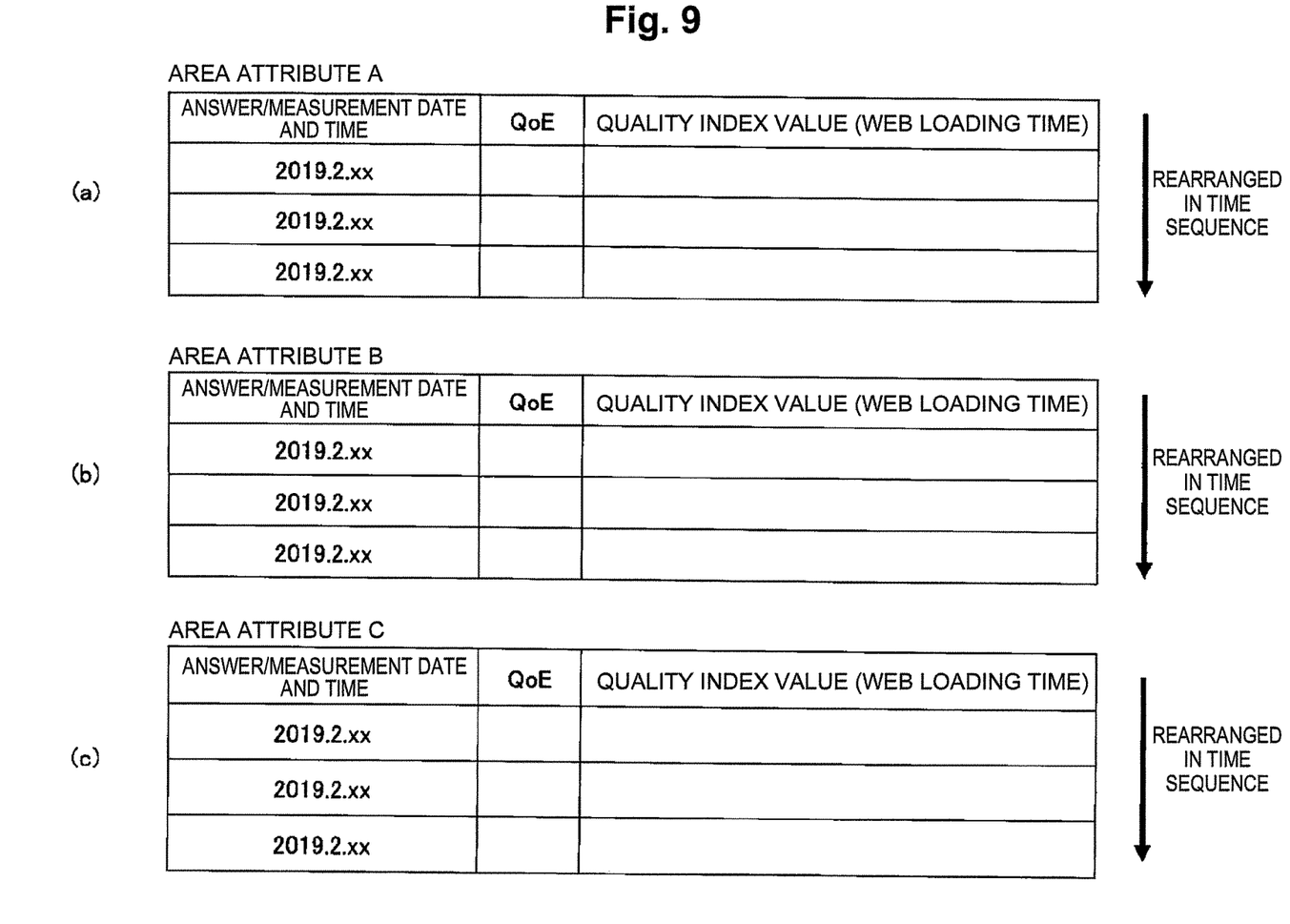
FIGS. 9(a) to 9(c) are diagrams showing quality information with each area attribute.

As shown, for example, in FIG. 9, the collection unit 311 of the quality information collection device 310 records the quality information classified by area attribute and rearranged in time sequence in the quality information recording unit 312. Note that the classification of information by area attribute such as shown in FIG. 9 may be performed by the construction unit 321 of the quality information management device 320.

The transmission unit 313 of the quality information collection device 310 reads (information yet to be transmitted) out of the quality information recording unit 312 and transmits the information to the quality information management device 320, for example, periodically. Also, the transmission unit 313 of the quality information collection device 310 may read information (information yet to be transmitted) out of the quality information recording unit 312 upon receiving a request from the quality information management device 320, which manages quality information, and transmit the information to the quality information collection device 310.

<Construction of QoE Estimation Model Corresponding to Each Area Attribute>

The construction unit 321 of the quality information management device 320 receives quality information (QoE and quality index values (such as Web loading time) here) classified by area attribute from the quality information collection device 310 and constructs QoE estimation models according to the respective area attributes using the quality information. The QoE estimation models are used to estimate the QoE quality index values (such as Web loading time).

The method for constructing a QoE estimation model corresponding to each area attribute is not limited to a specific method. For example, the construction unit 321 inputs the QoE quality index value to the QoE estimation model in relation to each area attribute, adjusts parameters of the QoE estimation model so as to reduce a difference between an output QoE and correct QoE, and thereby constructs a QoE estimation model corresponding to each area attribute.

Also, for example, in the case of a Web browsing service, a QoE estimation model may be constructed based on a relationship between QoEs and quality index values using a technique described in Japanese Patent Laid-Open No. 2017-1 94756 (title of the invention: Web browsing quality estimation apparatus, Web browsing quality estimation method, and program). The unit of input data used in constructing the QoE estimation model may be day, week, month, or the like. If there are plural items of input data, a representative value (a mean value, maximum value, or the like) may be used.

The QoE estimation models (specifically, optimized parameters or the like) constructed according to respective area attributes are recorded in the QoE estimation model recording unit 322.

Estimation of QoE in Area Under Evaluation

Next, QoE estimation on the user terminal 100 in the area under evaluation using the QoE estimation model will be described.

It is assumed here that the dedicated application β has been installed on the user terminal 100. Using functions of the dedicated application β, the user terminal 100 running the dedicated application β periodically takes measurements in the background in the LTE or other wireless network environment and collects quality index values (such as Web loading time), position information (such as latitude and longitude), communications schemes (LTE and WiFi (registered trademarks)), and the like as measurement results. Note that the dedicated application β may be the dedicated application α or an application other than the dedicated application α.

Figure 10:
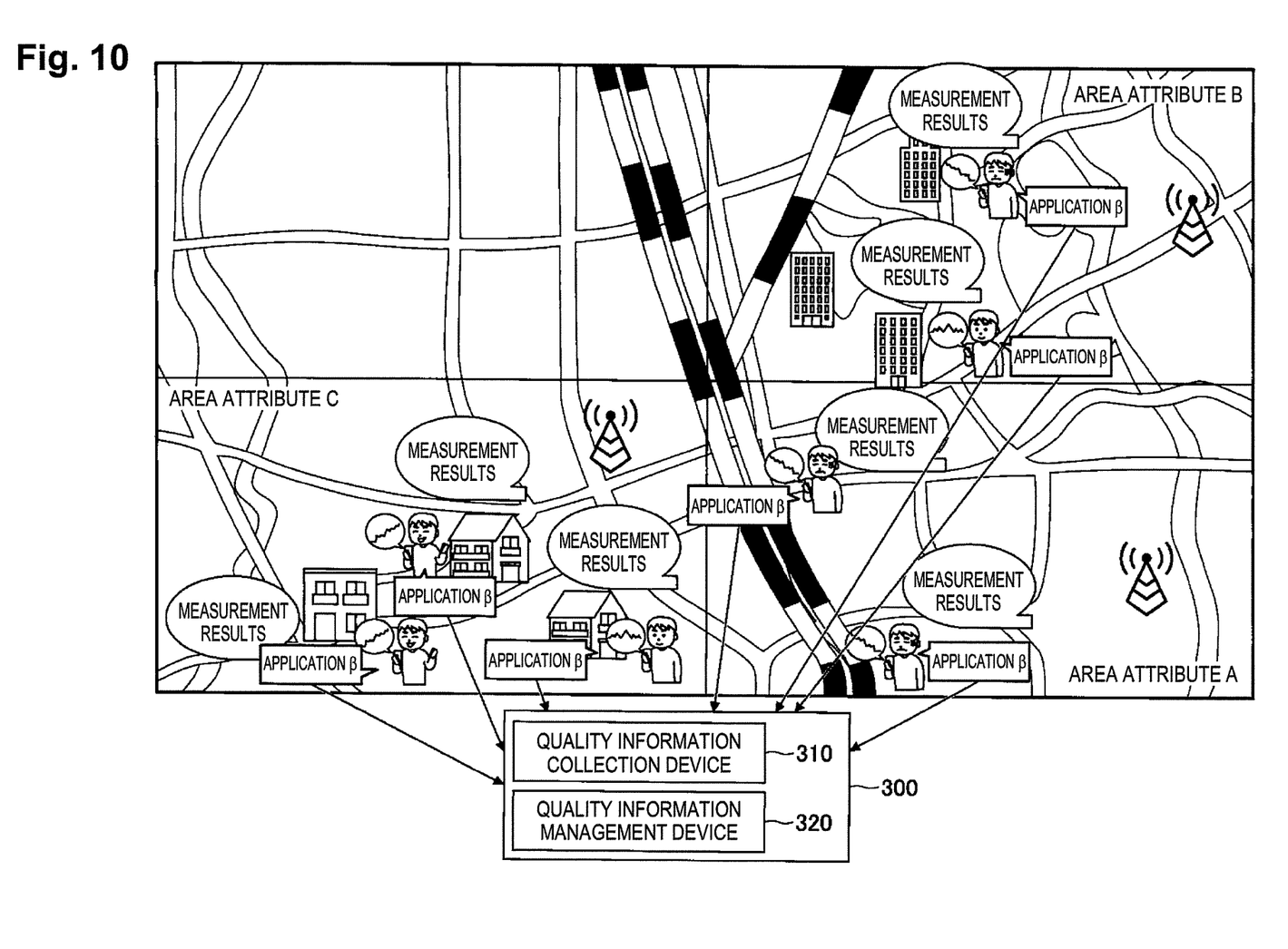
FIG. 10 is a diagram showing an image of information collection.

The measurement results collected by the user terminal 100 is temporarily recorded in the user terminal 100. The information recorded is, for example, the quality information shown in FIG. 8 excluding QoE. The user terminal 100 transmits the measurement results to the quality information management device 320, for example, periodically. Alternatively, the user terminal 100 may transmit the measurement results to the quality information management device 320 when there is a request from the quality information management device 320. Besides, the measurement results transmitted by the user terminal 100 may be received by the quality information collection device 310, and then transferred to the quality information management device 320 by the quality information collection device 310. An image of how measurement results are collected is shown in FIG. 10.

Note that instead of the user terminal 100 collecting and transmitting its own position information, the base station 200 may collect and transmit the position information about the user terminal 100 to the quality information management device 320. In that case, however, the quality information management device 320 needs to link measurement time of the position information and measurement time of the quality index value to each other.

Figure 11:
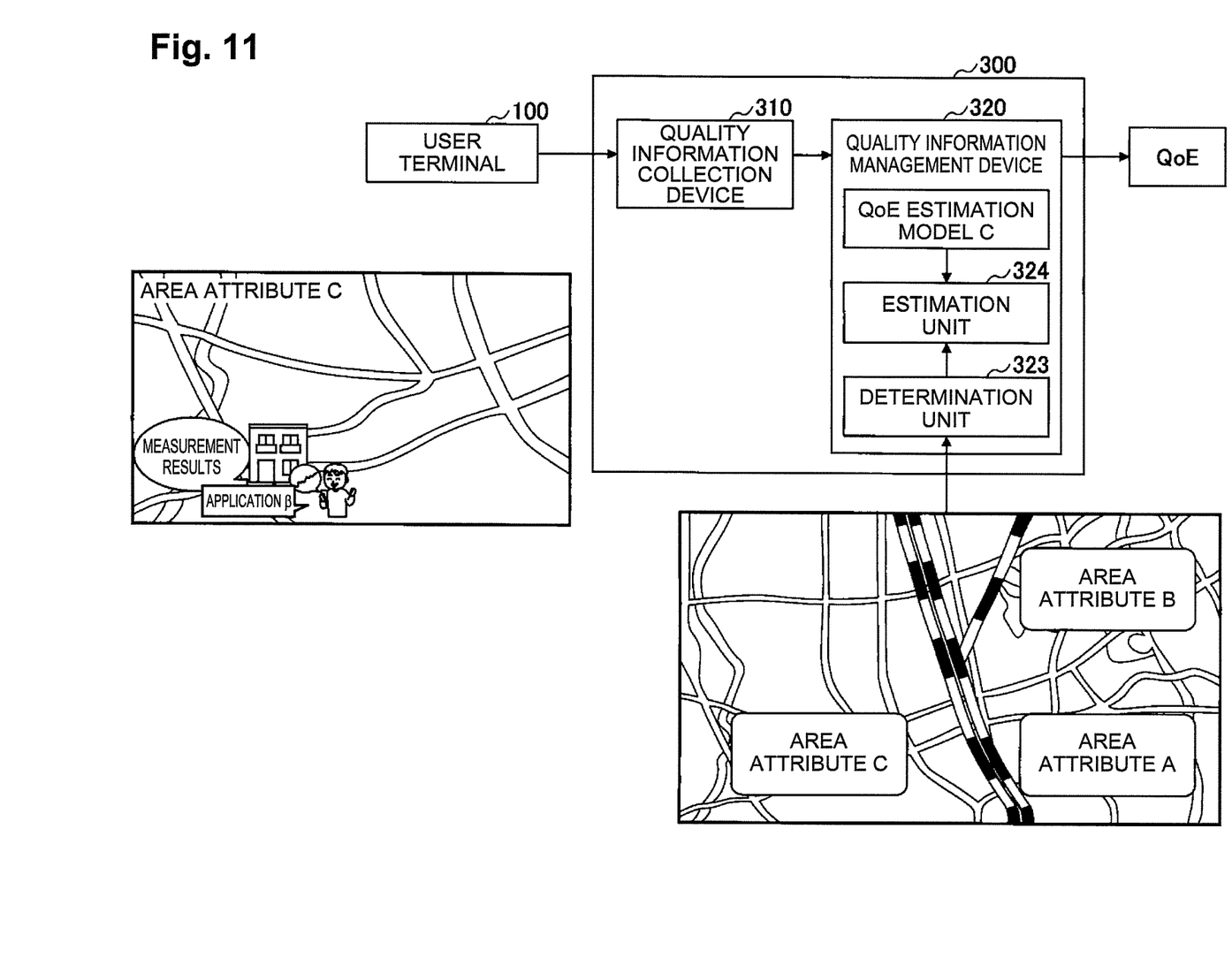
FIG. 11 is a diagram for explaining QoE estimation in a target evaluation area.

The determination unit 323 of the quality information management device 320 holds the mapping information between the areas identified by the position information and the area attributes. An image of this is shown in FIG. 11. The mapping information between areas and area attributes may be generated by the quality information management device 320 itself, acquired by the quality information management device 320 from the quality information collection device 310 generating the mapping information, or acquired by the quality information management device 320 by another method.

Upon receiving measurement results (quality index value, position information, etc.) from the user terminal 100, the determination unit 323 of the quality information management device determines the area attribute corresponding to (the area corresponding to) the position information from the mapping information and informs the determined area attribute to the estimation unit 324.

The estimation unit 324 acquires the QoE estimation model corresponding to the area attribute from the QoE estimation model recording unit 322 and estimates the QoE on the user terminal 100 from the quality index value using the QoE estimation model.

In the example of FIG. 11, the QoE on the user terminal 100 existing in the area with area attribute C is estimated using QoE model C.

Effect of Embodiment

The technique according to the present embodiment can implement QoE estimation close to user experience by adopting an optimum model for an area under evaluation from QoE estimation models constructed for the respective area attributes beforehand.

Summary of Embodiment

As has been described above, the present specification discloses at least the following matters.

(Item 1)
A quality estimation apparatus comprising:
an acquisition unit configured to acquire quality information including QoEs and quality index values collected on a user terminal in a wireless network environment; and
a construction unit configured to classify the QoEs and quality index values according to area attributes, the QoEs and quality index values being acquired by the acquisition unit, and construct QoE estimation models according to the respective area attributes using the QoEs and quality index values for the respective area attributes.

(Item 2)
The quality estimation apparatus according to item 1, comprising:
a determination unit configured to acquire a quality index value from a target user terminal whose QoE is to be estimated and determine an area attribute of an area in which the target user terminal is located, based on mapping information between areas and area attributes; and
an estimation unit configured to estimate QoE on the target user terminal based on the quality index value acquired from the target user terminal, using the QoE estimation model corresponding to the area attribute determined by the determination unit.

(Item 3)
The quality estimation apparatus according to item 1 or 2, comprising a generation unit configured to generate mapping information between areas and area attributes based on position information that indicates a position in which the user terminal is located and time-series information about the quality index values.

(Item 4)
The quality estimation apparatus according to item 3, wherein the generation unit generates the mapping information based on the number of peaks in the quality index values and on time slots in which the peaks occur.

(Item 5)
A model construction method performed by a quality estimation apparatus, the method comprising:
an acquisition step of acquiring quality information including QoEs and quality index values collected on a user terminal in a wireless network environment; and
a construction step of classifying the QoEs and quality index values according to area attributes, the QoEs and quality index values being acquired by the acquisition step, and constructing QoE estimation models according to the respective area attributes using the QoEs and quality index values for the respective area attributes.

(Item 6)
An estimation method performed by a quality estimation apparatus, the method comprising:
an acquisition step of acquiring quality information including QoEs and quality index values collected on a user terminal in a wireless network environment;
a construction step of classifying the QoEs and quality index values according to area attributes, the QoEs and quality index values being acquired by the acquisition step, and constructing QoE estimation models according to the respective area attributes using the QoEs and quality index values for the respective area attributes;
a determination step of acquiring a quality index value from a target user terminal whose QoE is to be estimated and determining an area attribute of an area in which the target user terminal is located, based on mapping information between areas and area attributes; and
an estimation step of estimating QoE on the target user terminal based on the quality index value acquired from the target user terminal, using the QoE estimation model corresponding to the area attribute determined by the determination step.

(Item 7)
A program that causes a computer to function as the units of the quality estimation apparatus according to any one of items 1 to 4.

Whereas an embodiment of the present invention has been described above, the present invention is not limited to such a specific embodiment, and various modifications and changes can be made without departing from the spirit and scope of the invention set forth in the appended claims.

REFERENCE SIGNS LIST

100 User terminal
110 Quality information measurement unit
120 Quality information recording unit
130 Quality information transmission unit
200 Base station
210 Position information measurement unit
220 Position information transmission unit
310 Quality information collection device
311 Collection unit
312 Quality information recording unit
313 Transmission unit
314 Generation unit
320 Quality information management device
321 Construction unit
322 QoE estimation model recording unit 323 Determination unit
324 Estimation unit
1000 Drive device
1001 Recording medium
1002 Auxiliary storage device
1003 Memory device
1004 CPU
1005 Interface device
1006 Display device
1007 Input device

The invention claimed is:

1. A quality estimation apparatus comprising:
a processor; and
a memory that includes instructions, which when executed, cause the processor to execute:
acquiring quality information including quality of experience information and quality index values collected on a user terminal in a wireless network environment;
determining a first area attribute and a second area attribute, based on the acquired quality index values;
recording an information set including (i) a first subset of the quality information associated with the first area attribute, and (ii) a second subset of the quality information associated with the second area attribute; and
constructing (i) a first quality of experience estimation model for the first area attribute, and (ii) a second quality of experience estimation model for the second area attribute, based on the information set.

2. The quality estimation apparatus according to claim 1, wherein the processor is further caused to execute:
acquiring a quality index value from a target user terminal whose quality of experience is to be estimated and determining an area attribute of an area in which the target user terminal is located, based on mapping information between areas and area attributes; and
estimating quality of experience on the target user terminal based on a quality index value acquired from the target user terminal, using a quality of experience estimation model corresponding to the determined area attribute.

3. The quality estimation apparatus according to claim 1, wherein the determination of the first area attribute and the second area attribute is based on position information that indicates a position in which the user terminal is located, and time-series information about the acquired quality index values.

4. The quality estimation apparatus according to claim 3, wherein the determination of the first area attribute and the second area attribute is based on the number of peaks in the quality index values and on time slots in which the peaks occur.

5. The quality estimation apparatus according to claim 4, wherein the first area attribute indicates a commuting route, and the quality index values includes a peak in the morning and a peak in the evening.

6. The quality estimation apparatus according to claim 4, wherein the first area attribute indicates a business district, and the quality index values includes a peak only in a time slot corresponding to a lunch break.

7. The quality estimation apparatus according to claim 4, wherein the first area attribute indicates a residential district, and the quality index values includes a peak only in the nighttime.

8. The quality estimation apparatus according to claim 1, wherein the quality index values include web loading time.

9. The quality estimation apparatus according to claim 1, wherein the first subset of the quality information and the second subset of the quality information are rearranged in time sequence.

10. A method, comprising:
acquiring quality information including quality of experience information and quality index values collected on a user terminal in a wireless network environment;
determining a first area attribute and a second area attribute, based on the acquired quality index values;
recording an information set including (i) a first subset of the quality information associated with the first area attribute, and (ii) a second subset of the quality information associated with the second area attribute; and
constructing (i) a first quality of experience estimation model for the first area attribute, and (ii) a second quality of experience estimation model for the second area attribute, based on the information set.

11. The method according to claim 10, further comprising:
acquiring a quality index value from a target user terminal whose quality of experience is to be estimated and determining an area attribute of an area in which the target user terminal is located, based on mapping information between areas and area attributes; and
estimating quality of experience on the target user terminal based on a quality index value acquired from the target user terminal, using a quality of experience estimation model corresponding to the determined area attribute.

12. The method according to claim 10, wherein the determination of the first area attribute and the second area attribute is based on position information that indicates a position in which the user terminal is located, and time-series information about the acquired quality index values.

13. The method according to claim 10, wherein the determination of the first area attribute and the second area attribute is based on the number of peaks in the quality index values and on time slots in which the peaks occur.

14. The method according to claim 10, wherein the quality index values include web loading time.

15. A non-transitory computer readable medium storing a program, which when executed, causes a computer to:
acquire quality information including quality of experience information and quality index values collected on a user terminal in a wireless network environment;
determine a first area attribute and a second area attribute, based on the acquired quality index values;
record an information set including (i) a first subset of the quality information associated with the first area attribute, and (ii) a second subset of the quality information associated with the second area attribute; and
construct (1) a first quality of experience estimation model for the first area attribute, and (ii) a second quality of experience estimation model for the second area attribute, based on the information set.

16. The non-transitory computer readable medium according to claim 15, wherein the program, which when executed, further causes the computer to:
acquire a quality index value from a target user terminal whose quality of experience is to be estimated and determining an area attribute of an area in which the target user terminal is located, based on mapping information between areas and area attributes; and
estimate quality of experience on the target user terminal based on a quality index value acquired from the target user terminal, using a quality of experience estimation model corresponding to the determined area attribute.

17. The non-transitory computer readable medium according to claim 15, wherein the determination of the first area attribute and the second area attribute is based on position information that indicates a position in which the user terminal is located, and time-series information about the acquired quality index values.

18. The non-transitory computer readable medium according to claim 15, wherein the determination of the first area attribute and the second area attribute is based on the number of peaks in the quality index values and on time slots in which the peaks occur.

19. The non-transitory computer readable medium according to claim 15, wherein the quality index values include web loading time.

* * * * *